(12) United States Patent
Goldman

(10) Patent No.: US 9,143,594 B2
(45) Date of Patent: *Sep. 22, 2015

(54) MASS DEPLOYMENT OF COMMUNICATION HEADSET SYSTEMS

(71) Applicant: GN Netcom A/S, Ballerup (DK)

(72) Inventor: Tomasz Jerzy Goldman, Hellerup (DK)

(73) Assignee: GN Netcom A/S (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/016,604

(22) Filed: Sep. 3, 2013

(65) Prior Publication Data

US 2014/0004910 A1    Jan. 2, 2014

Related U.S. Application Data

(63) Continuation of application No. 13/214,977, filed on Aug. 22, 2011, now Pat. No. 8,606,334.

(30) Foreign Application Priority Data

Aug. 24, 2010    (EP) ..................... 10173669

(51) Int. Cl.
*H04M 1/60* (2006.01)
*H04M 1/725* (2006.01)
(Continued)

(52) U.S. Cl.
CPC .......... *H04M 1/6066* (2013.01); *H04M 1/6058* (2013.01); *H04M 1/72502* (2013.01); *H04W 8/22* (2013.01); *H04M 3/51* (2013.01)

(58) Field of Classification Search
CPC ............ H04M 1/6058; H04M 1/6066; H04M 1/0241; H04M 1/05; H04M 1/6033; H04M 1/6041; H04M 2250/00; H04M 1/7253; H04M 9/00; H04M 9/001; H04R 5/033; H04R 5/04; H04R 1/10; H04R 2201/10; H04R 2201/107; H04R 2420/07; H04B 1/385; H04B 2001/385; H04B 2001/3866; H04B 2001/3872; H04B 1/40; H04S 1/005; H04S 7/306; H04W 4/008; H04H 60/46; G06F 3/01; G06F 3/011; G06F 3/012; G10K 2210/1081
USPC .......... 455/418–420, 575.2, 41.2, 561, 569.1; 379/26.01–27.04, 174, 428.02, 430; 381/74, 367, 370

See application file for complete search history.

(56) References Cited

U.S. PATENT DOCUMENTS 3,986,039 A  *  10/1976  Bovitz .......................... 307/137
5,734,713 A        3/1998  Mauney et al.
(Continued)

FOREIGN PATENT DOCUMENTS

DE    2004 012 84    10/2004
EP    2204972        7/2010

OTHER PUBLICATIONS

GN Netcom: "Jabra Pro 9460, 9460-Duo and 9470", Dec. 31, 2009, XP55013692, http://dfcorec-p/wf/web/citenpl/citenpl.html?_url=http%3A52F52Fheadsetplus.com%2FPDF%2F9460_9470_Manual.pdf, 5.5 Central Adminstration and Mass Deployment; p. 24, pp. 52-53.

(Continued)

*Primary Examiner* — Michael Mapa
(74) *Attorney, Agent, or Firm* — Altera Law Group, LLC

(57) ABSTRACT

The present disclosure relates to devices, systems and methods for programming base units of communication headset systems with new or updated configuration parameters by a portable or handheld programming unit.

13 Claims, 3 Drawing Sheets

(51) Int. Cl.
*H04M 3/51* (2006.01)
*H04W 8/22* (2009.01)

(56) References Cited

U.S. PATENT DOCUMENTS

| | | | |
|---|---|---|---|
| 7,283,635 B1 * | 10/2007 | Anderson et al. | 381/74 |
| 8,606,334 B2 * | 12/2013 | Goldman | 455/569.1 |
| 2002/0076060 A1 * | 6/2002 | Hall et al. | 381/74 |
| 2004/0058674 A1 * | 3/2004 | Yoakum | 455/416 |
| 2005/0149368 A1 | 7/2005 | Brunet et al. | |
| 2006/0067302 A1 | 3/2006 | Wengrovitz et al. | |
| 2007/0004463 A1 | 1/2007 | Clark et al. | |
| 2007/0127709 A1 | 6/2007 | Takahashi | |
| 2007/0137462 A1 * | 6/2007 | Barros et al. | 84/453 |
| 2007/0225035 A1 * | 9/2007 | Gauger et al. | 455/553.1 |
| 2008/0080705 A1 * | 4/2008 | Gerhardt et al. | 379/430 |
| 2008/0234878 A1 * | 9/2008 | Joao | 701/2 |
| 2009/0215393 A1 | 8/2009 | Smyers | |
| 2010/0020729 A1 | 1/2010 | Walley et al. | |
| 2010/0151788 A1 * | 6/2010 | Rahman et al. | 455/41.2 |

OTHER PUBLICATIONS

Extended European Search Report for EP application No. 11178455.9.

* cited by examiner

MASS DEPLOYMENT OF COMMUNICATION HEADSET SYSTEMS

The present disclosure relates to devices, systems and methods for configuring base units of communication headset systems with new or updated configuration parameters by a portable or handheld programming unit.

BACKGROUND

A headset system comprises a headset, often designated "portable part", coupled to a base unit, often designated "fixed part", through a wired or wireless communication channel or line. Such headset systems are well-known in the art. Headsets are highly popular communication devices in wide-spread use since they facilitate hands-free working efficiency and wireless mobility allowing one-way or two-way communication between a headset user and a distant talker.

The base unit is normally connected to a desktop phone or switch board via a wired two-way communication interface allowing the user to initiate, answer and end telephone calls through the headset by appropriate manipulation of control buttons or switches on the headset or the base unit.

Large enterprises such as call-centres or office environments typically comprise a large number of individual headsets systems such as more than 50, 100, 1000 or even more headset systems.

The base units of these headset systems may need to be configured with the same and appropriate base configuration parameters to provide a uniform standardized setup throughout the enterprise. However, in prior art headset systems programming/configuration or re-programming/re-configuration of the base units have been effected by applying complex actuation patterns to certain push or switch buttons residing on the base unit housings. For setups or installations with a large number of headset systems, this methodology for configuration of base units tends to be time-consuming for the system administrator or tedious and error-prone if carried out by the individual headset users.

Since these headset systems often lack traditional data network connectivity (save for the actual telephone network itself) that would allow traditional mass deployment tools to be used to configure or re-configure the large number of base units, an efficient and safe procedure for configuring or re-configuring the large number of base units with the same base configuration parameters is highly desirable.

In the present base context configuration parameters at least comprise parameters relating to interface settings between the base unit and a telecommunication device such as a desktop phone or a computer device hosting a softphone application. The interface settings including e.g. termination switch setting, microphone gain setting, transmit volume setting, hook-switch protocol selection, RF range/RF power selection, sound mode selection, audio sampling frequency, protection level selection (e.g. IntelliTone®) etc.

These base configuration parameters are distinct from personal or user-adjustable preference parameters like volume setting, frequency response equalization, etc.

EP 2204972 A1 discloses a complex automated setup routine that must be carried out for each individual headset system to configure e.g. termination switch settings and microphone gain of the headset system's telephone interface unit.

U.S. Pat. No. 7,283,635 B1 discloses a headset with built-in memory to store user specific parameter settings relating to headset performance characteristics. A host adapter may communicate with the headset through a serial communication port of the headset. The host adapter may read the headset performance characteristics and adjust signal transmitted to and received from the headset in accordance thereto.

SUMMARY

A first aspect of the disclosure relates to method of configuring a base unit of a communication headset system by means of a portable programming unit, the method comprising steps of:
i) determining a set of base configuration parameters related to an interface between the base unit and a telecommunication device,
ii) storing the set of base configuration parameters in the portable programming unit,
iii) connecting the portable programming unit to the base unit through a data interface,
iv) detecting and receiving the set of base configuration parameters in the base unit,
v) storing the set of received base configuration parameters in the base unit.

The present methodology for configuring or programming a base unit of a headset system allows a plurality of base units to be configured with an identical and appropriate set of base configuration parameters in an efficient manner to provide a uniform or standardized headset setup throughout a certain part of an enterprise or the entire enterprise. By utilizing the present configuration methodology, a system administrator can avoid time consuming and error prone programming or re-programming of individual base units by application of complex button/switch actuation patterns. Furthermore, it is not necessary for each individual headset system to have initiated a very complex processor resource consuming and time consuming setup routine automatically running on the base unit. Often these automated routines still need some kind of manual interaction during the setup of the base unit configuration parameters.

The base configuration parameters are related to an interface between the base unit and a telecommunication device, such as a telephone device connected to a telephone line, the telephone line may comprise an analogue or a digital telephone line. The digital telephone line may comprise a standardized or proprietary data interface. The standardized data interface may comprise a USB interface, Firewire interface, IIC or Ethernet interface coupled to a digital hardware telephone or a software phone application.

The method of configuring the base unit may further comprise, prior to step ii) above, transferring the set of base configuration parameters to the portable programming unit from a base configuration parameter host device, such as a reference headset base unit, a local or remote server or a personal computer device. The parameter host device may comprise a database for storing base configuration parameters and a data interface for uploading and/or downloading the configuration parameters to and/or from the host device. In this way the right set of base unit parameters may be loaded into the portable programming unit from an already configured base unit (reference base unit) or directly via a suitable data interface from the system administrator's server or from e.g. the headset system vendor's server or from a personal computer. The set of parameters may be downloaded from the server as a file download. The server may comprise a database of configuration parameters corresponding to interfaces between headset base units and different types of telephone systems. The database may be maintained and/or hosted by the vendor of the headset systems.

In one embodiment, the method of configuring the base unit comprises steps of:

a) writing the set of base configuration parameters to a predetermined memory space of an electronic memory of a reference base unit, b) removing the portable programming unit from the reference base unit, c) coupling the portable programming unit to a second base unit through the data interface, d) detecting and receiving the set of base configuration parameters in the second base unit, e) writing the set of received base configuration parameters to a predetermined memory space of the second base unit.

Operations or steps performed in the host device such as determining the set of base configuration parameters, writing the set of base configuration parameters to a predetermined memory space and transferring the set of base configuration parameters to the portable programming unit through the data interface are preferably executed under control of a suitably programmed microprocessor in accordance with a corresponding set of program instructions. Alternatively, one or more of these steps may be entirely or at least partly executed by hard-wired application specific logic circuitry, possibly including programmable logic. Likewise, steps d) and e) in the second base unit, may be executed under control of a suitably programmed microprocessor in accordance with a set of program instructions or hard-wired application specific logic circuitry or any combination of both.

A large number of individual base units may be configured or re-configured by the system administrator for mass deployment of configuration parameters. Advantageously the method may be repeated for a number of further base units by repeating steps iii), iv) and v) or steps c), d) and e) to configure the further base unit(s) with the same set of base configuration parameters. The system administrator may carry the portable programming unit from one base unit to the next one and couple the portable programming unit to the next base unit wherein the presence of base configuration parameters is detected once data communication has been established between the portable programming unit and the base unit in question. Subsequently, the set of base configuration parameters is read from the portable unit and stored in the predetermined memory space of the second base unit. The predetermined memory space may comprise non-volatile memory such as EEPROM or Flash memory.

In one embodiment, the method further comprises, transmitting an audible, a tactile or a visible confirmation signal from the base unit confirming storage of the set of base configuration parameters. The confirmation signal informs the system administrator or headset user of a successful configuration or re-configuration of the second base unit and likewise for any further base units to be configured or re-configured. A visible confirmation signal may be displayed as text or symbol(s) on an existing display of the base unit or as by a particular lighting sequence of an indicator LED mounted on the base unit. The confirmation signal may alternatively be displayed on a display or LED indicator mounted on the portable programming unit.

According to one preferred embodiment of the disclosure, the portable programming unit comprises a headset. Further headset systems may be configured by means of the same headset and the headset may be of the same make and model as all or some of the other headsets of the headset systems. This embodiment of the disclosure saves resources and expenses that would be associated with fabrication of dedicated portable programming units. Instead existing headsets are adapted to act as programming units for the plurality of base units. Furthermore, physical coupling between the second base unit, or other base units, and the portable programming unit is simplified because of the existing interoperability, i.e. the already mating shapes of respective housings and programming/data interface terminals of the base unit and the headset.

The portable programming unit is preferably adapted to operate in at least two distinct operation modes. A first non-programming mode may, when the portable programming unit is a headset, be a normal operation mode where the headset has been be paired with a specific base unit of the headset system. In the normal operation mode, the headset may be used to initialize, conduct and terminate telephone conversations by a headset user. In a second mode, or programming mode, the set of base configuration parameters, which has been loaded into the memory space of the portable programming unit at a predetermined memory address, is made accessible to the base units. In the latter mode, the headset is furthermore capable of identifying itself as a programming unit to the second base unit and any further base units upon physical and electrical interconnection or coupling thereto. The portable programming unit may conveniently be configured to enter the second mode (programming mode) by manipulating a portable programming unit actuator with a predetermined gesture to alter or switch the operation mode of the portable programming unit from a non-programming mode to a programming mode.

The portable programming unit actuator may comprise a user-operable push-button, switch, pressure sensor etc or comprise a microphone boom or other portions of a headset with built-in actuator functionality. The predetermined gesture may comprise a particular pattern of depression or manipulation of the actuator such as a prolonged depression for example extending for a period of time exceeding 3, 5 or 10 seconds. It may also involve movement of the headset boom into a different orientation (f.ex boom up, then down or the opposite, or boom swing out/in, etc.) Rapid movement of the headset (shaking head, nodding head, etc) with a movement sensor in the headset could be used as the triggering gesture which would be hands free.

The set of base configuration parameters comprises at least one parameter selected from a group of {termination switch setting such as for receive and transmit signals, microphone gain setting, transmit volume setting, hook-switch protocol selection such as for electronic hook-switching, RF range/RF power selection, sound mode selection, audio sampling frequency, protection level selection}. In addition, parameters related to user-preference settings may be added to the set of base configuration parameters to provide all users of the headset systems with a uniform setting of the user-preference parameters.

The method ensures the right interface settings between the headset base unit and a telecommunication device. The telecommunication device may comprise a telephone device such as an analogue or digital PSTN telephone, an IP telephone, a cordless or wireless telephone or a computer device with an installed softphone application.

A second aspect of the disclosure relates to a portable programming unit for transferring configuration parameters to a base unit of a headset system, comprising:

a portable unit memory space configured to store a set of base configuration parameters related to an interface between the base unit and a telecommunication device, a data interface connectable to a data interface of the base unit, a processor configured to receive the set of base configuration parameters through the data interface and store the set of base configuration parameters in the portable unit memory space, an actuator configured to, in response to a predetermined gesture, alter an operation mode of the portable programming unit between a non-programming mode and a programming mode.

In a preferred embodiment the portable programming unit comprises a headset.

Possible embodiments and functions of the predetermined gesture and the actuator or headset actuator are described above in connection with the first aspect of the disclosure. The portable programming unit preferably comprises a headset such as a headset of the same make and model as other headsets of the communication headset systems to be programmed or configured in accordance with the first aspect of the present disclosure.

According to a preferred embodiment of the portable programming unit, the actuator is operatively connected to the processor and the processor configured to detect the predetermined gesture and alter between operation modes in response thereto. The actuator may produce a logic signal that is conveyed to a suitable input port of the processor allowing the processor to determine a state of the actuator. The input port of the processor may be adapted to detect a rising or falling edge or a level of the logic signal produced by the actuator. The processor may comprise a programmed or programmable microprocessor or micro-controller. Suitable microprocessors are available from many sources such as National Semiconductor and ARM. An ARM® processor may comprise microprocessor models such as ARM7TDMI, ARM Cortex M3, etc.

The portable unit memory space may be integrated together with the processor and comprise EEPROM or flash memory. Alternatively, the portable unit memory space may be situated in dedicated memory devices or chips coupled to the processor through a suitable electrical memory interface, such an I2C based serial interface, which allows the processor to read and write the set of base configuration parameters and other data to a memory segment or address range of the portable unit memory space.

The set of base configuration parameters, stored in the portable unit memory space, preferably comprises at least one parameter selected from a group of {termination switch setting, microphone gain setting, transmit volume setting, hookswitch protocol selection, RF range/RF power selection, sound mode selection, audio sampling frequency, protection level selection}.

A third aspect of the disclosure relates to a communication headset system comprising:
a base unit comprising:
  a data interface connectable to a portable programming unit,
  a base memory space configured to store a set of base configuration parameters related to an interface between the base unit and a telecommunication device,
a portable programming unit comprising:
  a data interface connectable to the data interface of the base unit,
  a portable unit memory space configured to store the set of base configuration parameters,
  a processor configured to receive the set of base configuration parameters through the data interface and write the set of base configuration parameters to the portable unit memory space,
  an actuator configured to, in response to a predetermined gesture, switch operation mode of the portable programming unit between a non-programming mode and a programming mode.

The data interface between the base unit and the portable programming unit may comprise a wireless data interface. In that case transferring configuration parameters may be done wirelessly with or without physically docking the portable programming unit in the cradle of the base unit.

The respective functions and features of the portable programming unit and the base unit may naturally comprise one or more of the previously described features of these devices in accordance with the first and second aspects of the disclosure. The base unit may for example comprises anyone of an audible, a tactile, a visible confirmation signal generator adapted to confirm storage of the set of configuration parameters in the base unit to a user.

This summary has been provided to assist the reader in understanding the full disclosure contained in this document. The summary is not intended as a limitation of the invention. The claims define the scope of patents granted.

BRIEF DESCRIPTION OF THE DRAWINGS

A preferred embodiment of the disclosure will be described in more detail in connection with the appended drawings, in which.

DESCRIPTION OF PREFERRED EMBODIMENTS

Figure 1:
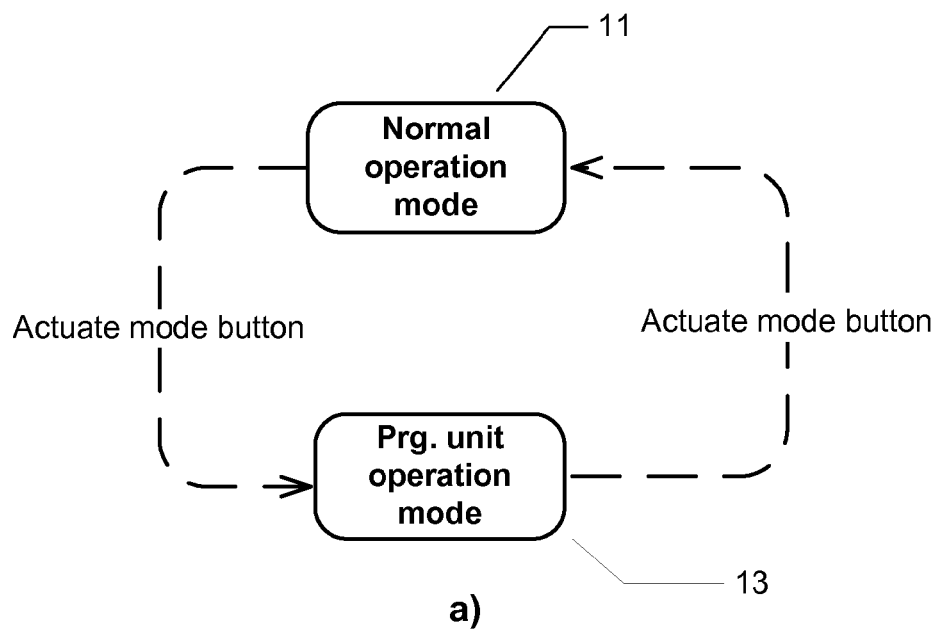
FIG. 1a) depicts operation modes of a headset for a headset system in accordance with a preferred embodiment of the disclosure, FIG. 1b) illustrates steps for preparing or configuring the headset for operating as a programming unit for a base unit of the headset system.
Figure 1:
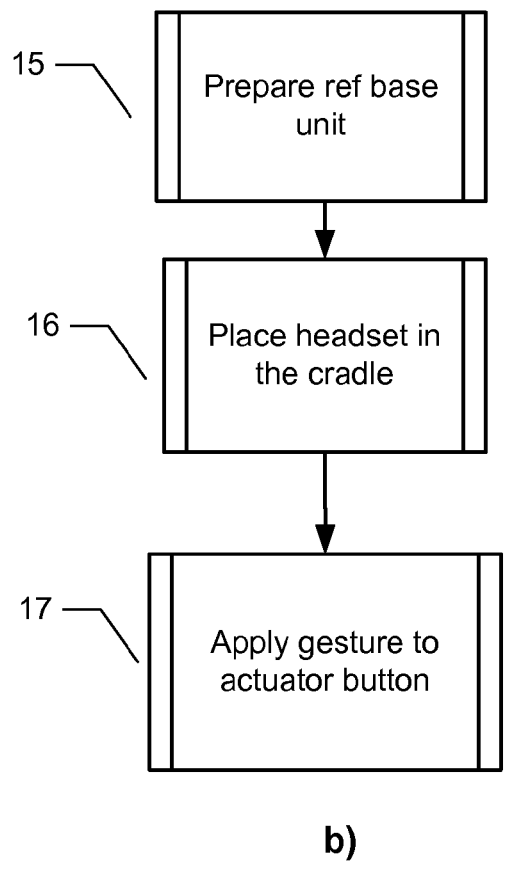

FIG. 1a) shows how to change between operation modes of a headset in accordance with an embodiment of the disclosure. The headset is preferably a modified version of a normal headset such as a GN Netcom model GN9330, wherein a dedicated set of program instructions provides additional functionality in the programming unit mode of operation. An existing actuator of the headset in combination with a subset of the dedicated set of program instructions is preferably utilized to detect the predetermined gesture and facilitate switching between normal operation mode and the programming unit mode. In this manner, the inventive headset may be completely identical to a normal or standard headset in terms of physical construction and components and the additional functionality provided solely by the dedicated set of program instructions or dedicated software routine or application. As illustrated on FIG. 1a), consecutive actuations of the actuator or mode button with the predetermined gesture lead to a switching forth and back between the normal operation mode 11 and the programming mode 13 of the headset.

FIG. 1b) illustrates steps for preparing or configuring the headset for operating in the headset system. In step 15, the reference base unit is prepared to transmit or upload the set of base configuration parameters to the above-described headset. In step 15, the set of base configuration parameters of the reference base unit are determined by the system administrator or any other competent individual by performing a sequence of analytical and/or experimental activities on a headset system comprising the reference base unit and a headset of the same type as the present headset. The sequence of analytical and/or experimental activities aim at determining optimal or appropriate parameter values for selected base configuration parameters such as one or more of the group of {termination switch setting, microphone gain setting, transmit volume setting, hook-switch protocol selection, RF range/RF power selection, sound mode selection, audio sampling frequency, protection level selection} in a particular headset system installation or setup comprising a plurality of individual headset systems.

Subsequently, in step 16 the system administrator places the headset in a docking cradle of the base unit (not shown). The placement of the headset in the docking cradle automatically establishes electrical connection through a combined power and data interface, in a preferred embodiment this combined power and data interface comprises three connections or lines in form of +5V DC supply voltage, ground and UART connections extending between the headset and the base unit via three pairs of mating terminals (not shown). In step 17, the system administrator applies the predetermined gesture to the mode button of the headset so as to place the headset in the programming unit mode. Subsequently, the previously determined base configuration parameters, now stored in a non-volatile memory space of the reference base unit, are automatically transferred or uploaded to the headset through the previously mentioned data interface.

Figure 2:
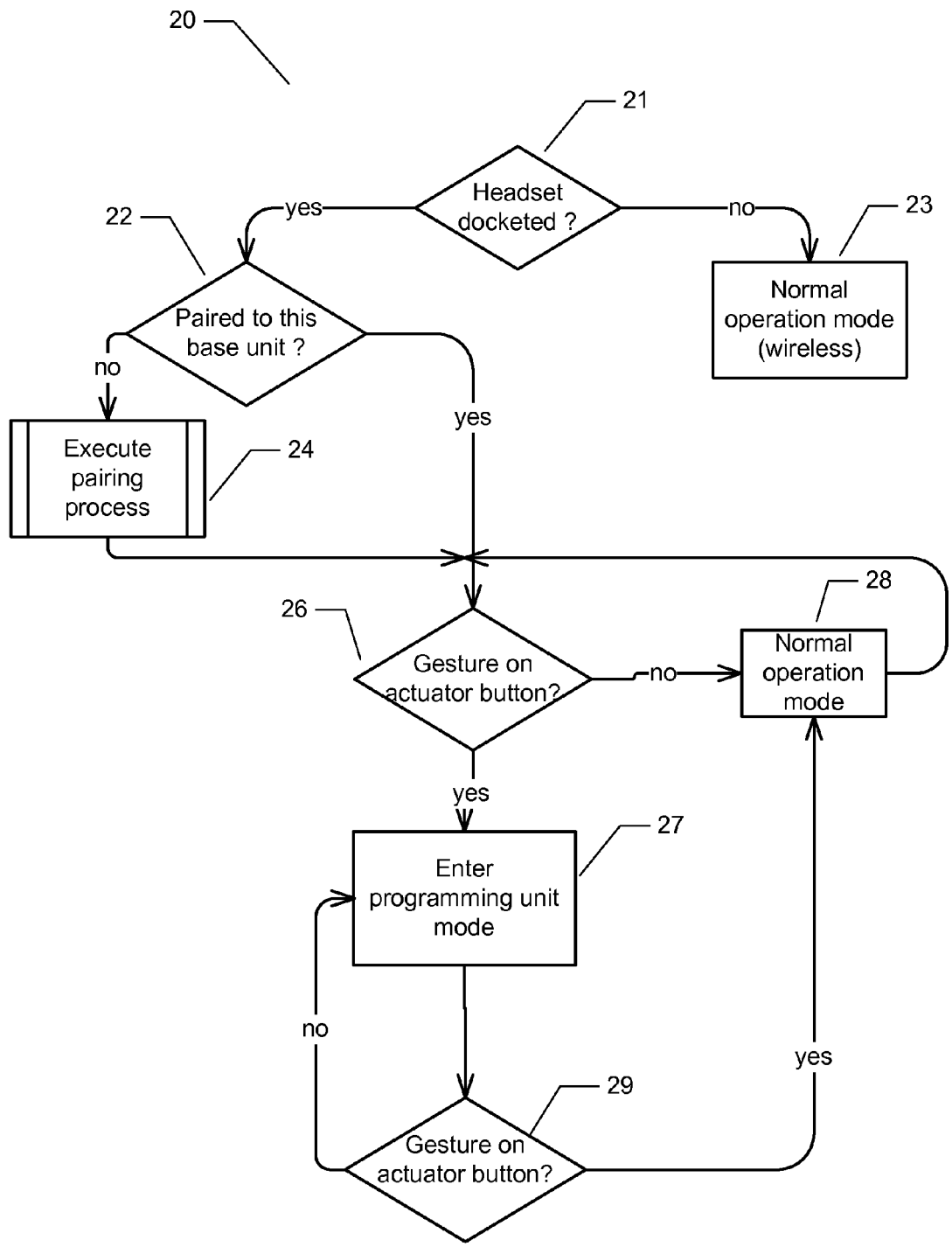
FIG. 2 is a flowchart illustrating logic steps executed by a headset processor to set an operation mode of the headset.

FIG. 2 is a flowchart 20 illustrating logic steps executed by a headset processor to determine the operation mode of the headset. In step 21, the headset processor determines whether or not the headset is docketed in a cradle of a base unit. If the answer is yes, the processor proceeds to step 22 and determines whether the headset is paired to the base unit. If the answer is no, the processor proceeds to step 23 and resumes normal operation for example through a wired or wireless communication link between the headset and the base unit.

If the headset is not paired to the base unit, the headset processor proceeds to step 24 and executes a pairing process or procedure in an ordinary manner well known to the skilled person. On the other hand if the headset processor determined that the headset was already paired to the base unit in question in step 22, the headset processor skips the pairing process and proceeds directly to step 26. In step 26, the headset processor monitors a logic state, or another suitable feature, of a mode signal generated by the mode button in response to actuation thereof. If the mode signal fails to indicate the presence of the gesture, the headset processor proceeds to step 28 wherein the operating mode of the headset is set to normal operation. The headset processor maintains the normal operation mode while monitoring the mode signal and the headset user can utilize the headset in an ordinary manner to place or receive telephone calls and conduct phone conversations.

When the headset processor in step 26 detects the presence of a gesture via the mode signal, the processor proceeds to step 27 and the headset enters the programming unit mode. In the programming unit mode, the headset is adapted to operate as a portable programming unit ready to convey the selected base configuration parameters to all or a sub-set of a second and further base units of the installation as described below in further detail with reference to FIG. 3. After entry of the programming unit mode in step 27, the headset processor proceeds to step 29 where the headset processor continues to monitor the logic state of the mode signal generated by the mode button and if no gesture is detected the headset processor maintains the headset in the programming unit mode as illustrated while the processor switches the headset to normal operation mode in step 29 in response to detection of the gesture on the mode button.

Figure 3:
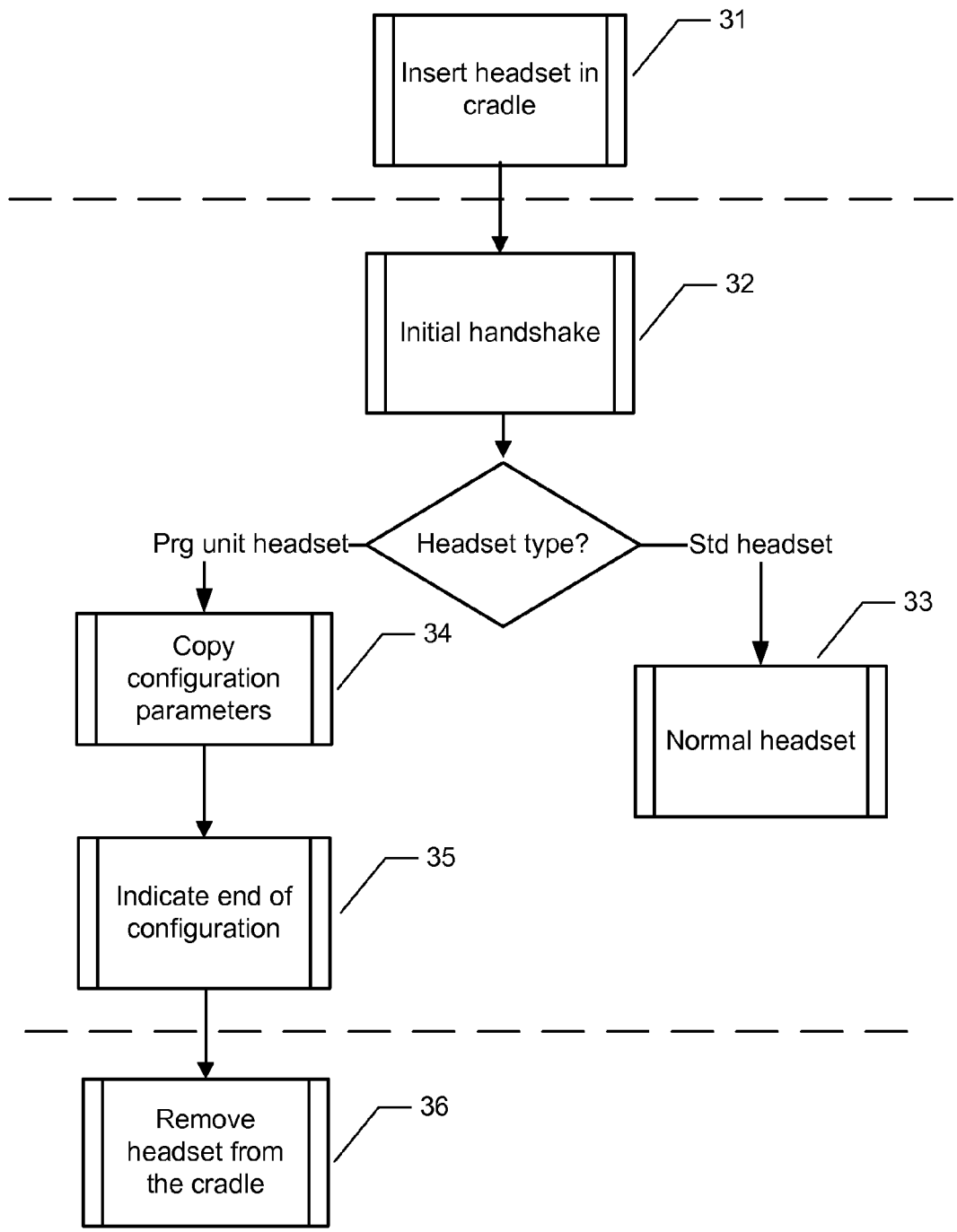
FIG. 3 is a flowchart illustrating logic steps executed on a second base unit of the headset system in order to read selected base configuration parameters from the headset.

FIG. 3 is a flowchart illustrating certain logic steps executed on a second base unit of a headset system in order to read the selected base configuration parameters from the headset and store these as configuration parameters of the second base unit. In a first step 31 the system administrator inserts a headset in the cradle of the second base unit. This step is preferably manual, but may of course be effected by an automatic or semi-automatic device such as a robotic device. It may also be done wirelessly by proximity of the headset in range of the base station. The base station and/or headset would preferably acknowledge/accept the download by some form of handshake or authorization so that the correct base station is affected if two stations are proximity. In step 32, the headset and the second base unit conduct an initial dialogue or handshake through the previously described combined data and power interface. After the handshake in step 32, the processor of the second base unit determines or detects whether the connected headset is an ordinary headset or a headset type comprising base configuration parameters in accordance with the present disclosure. This recognition or distinction may for example be made by reading the content of a certain memory address or addresses of the headset. Alternatively, the distinction may be made by examining content of the data exchanged during the initial handshake in step 32. If the connected headset comprises the base configuration parameters, the processor of the second base unit proceeds to step 34 to read and copy the set of base configuration parameters by writing this to the memory space or segment allocated for storage of configuration parameters in the second base unit. Once the set of base configuration parameters has been safely stored in the appropriate memory space of the second base unit, the processor proceeds to step 35 where an end of configuration or re-configuration of the second base unit is indicated to the system administrator (or another individual responsible for the deployment of the headset systems) for example through an audible, a tactile or a visible confirmation signal.

In response to the confirmation signal, which indicates a successful programming or reprogramming of the second base unit, the system administrator may remove the headset from the cradle in step 36 and optionally proceed to programming a third and further base units by repeating the above-outlined steps 31-36.

In an alternative embodiment of the disclosure, the above described combined power and data interface is replaced by a wireless interface and data protocol such as Bluetooth or DECT to eliminate the pairs of mating physical terminals associated with the combined power and data interface.

The invention claimed is:

1. A method of mass deployment of set up parameters from a reference base unit and special reference headset configured to operate with the reference base unit to a plurality of other base units each also having a normal headset associated therewith, of a communication headset system having a headset, the method comprising steps of:
   i) configuring said reference headset to operate in a first mode of audio communication with said base reference unit, and a second transfer programming mode,
   ii) configuring said reference headset to switch between modes,
   iii) determining a set of base configuration parameters related to an interface between the reference base unit and a telecommunication, iv) pairing said reference base unit with a reference headset, v) uploading a set of uniform base configuration parameters from the reference base unit to the reference headset selected from at least one of the following of the group of termination switch settings of receive and transmit signals, microphone gain setting, transmit volume setting, hook-switch protocol to the reference headset RF transmission power selection, sound bandwidth mode selection, audio sampling frequency, audio protection level selection;

vi) determining the current operating mode of the reference headset and switching said reference headset to transfer mode and uploading said network parameters to the reference headset;

vii) moving the reference headset to a location within communications range of another of said plurality of base units and coupling said reference headset to said base units, viii) linking to the reference headset to said another base unit through a data interface, ix) transmitting a signal from the reference headset to said another base unit to put said another base unit in a data transfer mode by a user movement to change to transfer mode to transfer the set of base configuration parameters in said another base unit, x) storing the set of received base configuration parameters in said another base unit, xi) decoupling said reference headset from one of said based units and switching said reference headset back to communications mode thereby allowing said reference headset to communicate through said another of said base units to download set up parameters, so that an operator may copy said base parameters into said reference headset and download identical parameters to other base units in said location from a single set of uploaded parameters, and xii) confirming recoupling said normal headset to said base unit, thereby allowing said base unit and normal headset to operate with identical set up parameters as other base units receiving parameters from said reference headset;

wherein the user movement includes movement of the user's headset in a predetermined pattern.

2. A method of mass deployment of set up parameters of a communication headset system according to claim 1, the method comprising steps of:
 a) writing the set of base configuration parameters containing at least one of the following: switch settings of receive and transmit signals, microphone gain setting, transmit volume setting, hook-switch protocol to the reference headset, RF transmission power selection, sound bandwidth mode selection, audio sampling frequency, audio protection level selection; to a predetermined memory space of an electronic memory of the reference base unit,
 b) removing the headset from the reference base unit,
 c) coupling the headset to a second base unit through the data interface,
 d) detecting and receiving the set of base configuration parameters in the second base unit,
 e) writing the set of received base configuration parameters to a predetermined memory space of the second base unit.

3. A method of mass deployment of set up parameters of a communication headset system according to claim 2, comprising: for a plurality of further base units, repeating steps vii), viii), ix), x), xii) to configure the further base unit(s) with the set of base configuration parameters.

4. A method of mass deployment of set up parameters of a communication headset system according to claim 2, comprising a step of:
 manipulating, prior to the step of storing the headset with a predetermined gesture involving movement of a switching element on the reference headset to switch the headset from said first mode to a storing mode to alter an operation mode of the headset from a non-programming mode to said second mode.

5. A method of mass deployment of set up parameters of a communication headset system according to claim 1, comprising:
 transmitting an audible, a tactile or a visible confirmation signal from another base unit confirming storage of the set of base configuration parameters.

6. A method of mass deployment of set up parameters of a communication headset system according to claim 1, wherein the headset further including initiating, by a gesture on the reference headset, putting the headset in programming mode with the base unit.

7. A method of mass deployment of set up parameters of a communication headset system according to claim 6, wherein other base stations are configured by physically transporting the same reference headset to other base stations.

8. A method of mass deployment of set up parameters of a communication headset system according to claim 1, wherein the telecommunication device comprises a telephone device including at least one of an analog or digital PSTN telephone, an IP telephone, a cordless or wireless telephone or a computer device with an installed softphone application.

9. A method of mass deployment of set up parameters from a reference base unit and special reference headset configured to operate with the reference base unit to a plurality of other base units each also having a normal headset associated therewith, of a communication headset system having a headset, the method comprising steps of:
 i) configuring said reference headset to operate in a first mode of audio communication with said base reference unit, and a second transfer programming mode,
 ii) configuring said reference headset to switch between modes,
 iii) determining a set of base configuration parameters related to an interface between the reference base unit and a telecommunication,
 iv) pairing said reference base unit with a reference headset,
 v) uploading a set of uniform base configuration parameters from the reference base unit to the reference headset selected from at least one of the following of the group of termination switch settings of receive and transmit signals, microphone gain setting, transmit volume setting, hook-switch protocol to the reference headset RF transmission power selection, sound bandwidth mode selection, audio sampling frequency, audio protection level selection;
 vi) determining the current operating mode of the reference headset and switching said reference headset to transfer mode and uploading said network parameters to the reference headset;
 vii) moving the reference headset to a location within communications range of another of said plurality of base units and coupling said reference headset to said base units, viii) linking to the reference headset to said another base unit through a data interface,
ix) transmitting a signal from the reference headset to said another base unit to put said another base unit in a data transfer mode by a user movement to change to transfer mode to transfer the set of base configuration parameters in said another base unit,
x) storing the set of received base configuration parameters in said another base unit,
xi) decoupling said reference headset from one of said based units and switching said reference headset back to communications mode thereby allowing said reference headset to communicate through said another of said base units to download set up parameters, so that an operator may copy said base parameters into said reference headset and download identical parameters to other base units in said location from a single set of uploaded parameters, and
xii) confirming recoupling said normal headset to said base unit, thereby allowing said base unit and normal headset to operate with identical set up parameters as other base units receiving parameters from said reference headset; wherein the user movement includes movement of the user's headset in a predetermined pattern which is detected by a motion sensor in the headset and which initiates predetermined functions according to said movement.

10. A portable wireless headset and programming unit for mass deployment of configuration parameters from a first reference base unit of a reference headset system to a plurality of additional base units each having a cradle, comprising:
   a headset connectable to a base unit and capable of operating in normal headset mode of receiving and transmitting sound to and from a base unit, having a cradle, to which it is coupled and wherein said headset further includes a portable unit memory space configured to store a set of base configuration parameters related to an interface between the base unit and a telecommunication device, said headset further including a switch to change modes to a programming mode wherein data may be transferred to additional base units,
   a data interface connectable to a data interface of the base unit,
   a processor configured to receive the set of base configuration parameters through the data interface and store the set of base configuration parameters in the portable unit memory space,
   an actuator configured to, in response to a predetermined user initiated gesture, alter an operation mode of the headset and portable programming unit between a non-programming mode and a programming mode, said gesture producing a logic signal that is conveyed to the processor allowing the processor to detect a transitional edge of a logic signal to cause the actuator to select the desired mode said gesture including inserting said headset in a cradle of another base unit,
   a detector in each of said base units for detecting and receiving the set of base configuration parameters from said headset,
so that a single headset can obtain configuration parameters from a reference base unit and transfer said parameters to a plurality of base units and be switchable between said modes communicate;
wherein the actuator is operatively connected to the processor,
   the processor being configured to detect the predetermined gesture and switch between operation modes in response thereto and wherein said gesture is selected from at least one of the following; detection of the movement of a boom microphone on the headset in a predetermined pattern; articulation of the headset user's head in a particular pattern which is detected by said motion sensor.

11. A portable programming unit according to claim 10, wherein the portable programming unit further includes a motion sensor for detecting a predetermined gesture of the headset to switch the headset from normal operational mode to programming mode.

12. A portable programming unit according to claim 10, wherein the actuator comprises a sensor in the headset to detect movement or position of a microphone boom attached thereto.

13. A portable programming unit according to claim 10, wherein the set of base configuration parameters, stored in the portable unit memory space, comprises at least one parameter selected from a group of {termination switch setting, microphone gain setting, transmit volume setting, hook-switch protocol selection, RF range/RF power selection, sound mode selection, audio sampling frequency, protection level selection}.

* * * * *